(12) United States Patent
Van Cleve et al.

(10) Patent No.: US 6,343,517 B1
(45) Date of Patent: *Feb. 5, 2002

(54) APPARATUS FOR CONNECTING A CORIOLIS FLOWMETER FLOW TUBE TO A FLOWMETER CASE

(75) Inventors: Craig Brainerd Van Cleve, Lyons; Gregory Treat Lanham, Longmont; Curtis John Ollila; Ernest Dale Lister, both of Westminster, all of CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/345,075

(22) Filed: Jun. 30, 1999

(51) Int. Cl.⁷ .................................. G01F 1/84
(52) U.S. Cl. ................................. 73/861.357
(58) Field of Search ............... 73/861.354, 861.355, 73/861.357

(56) References Cited

U.S. PATENT DOCUMENTS

| | | | |
|---|---|---|---|
| 5,365,794 A | 11/1994 | Hussain et al. | |
| 5,473,949 A | 12/1995 | Cage et al. | |
| 5,604,316 A | * 2/1997 | Alonso | 73/861.352 |
| 5,691,485 A | 11/1997 | Endo et al. | |
| 6,170,339 B1 | * 1/2001 | Van Der Pol et al. | 73/861.357 |

FOREIGN PATENT DOCUMENTS

| | | |
|---|---|---|
| EP | 0733886 A2 | 9/1996 |
| EP | 0759542 A1 | 2/1997 |
| EP | 0 759 542 A1 | 2/1997 |
| EP | 0908705 A2 | 4/1999 |

* cited by examiner

*Primary Examiner*—Max Noori
(74) *Attorney, Agent, or Firm*—Chrisman, Bynum & Johnson, P.C.

(57) ABSTRACT

A flowmeter having a case enclosing a single straight tube surrounded by a balance bar. The balance bar ends are coupled by means of a brace bar to the flow tube as well as by case connect links to the inner wall of the case. The flow tube ends are coupled to end flanges by means of a raised element having a center opening for sealably receiving the flow tube terminus. The flow tube projects beyond the case end and is sealably coupled to a cone connect element in the case end. A void is defined by the space between the flow tube outer surface and the inner surface of the cone connect element and the end flanges to minimize the surface area of the flow tube that is affected by the weld between the case end and raised element of the end flanges. The case connect links contain out of plane bends to accommodate a change in the effective diameter of the case and the balance bar with respect to each other due to changing thermal conditions. Another embodiment of the invention includes a flowmeter without the end flanges. The flow tube ends project beyond the case ends while being sealably coupled to the cone connect element in the case ends. The flowmeter may be manufactured, tested, and balanced and stored without a flange. The flowmeter is stored in this condition until its commercial use is imminent at which time it is fitted with the appropriate end flange required by the end user.

30 Claims, 5 Drawing Sheets

APPARATUS FOR CONNECTING A CORIOLIS FLOWMETER FLOW TUBE TO A FLOWMETER CASE

FIELD OF THE INVENTION

This invention relates to a Coriolis flowmeter and in particular to a single tube Coriolis flowmeter structure for connecting the vibrating elements of the Coriolis flowmeter to the flowmeter case. The invention further relates to a Coriolis flowmeter that can be manufactured, tested, balanced, and stored prior to the attachment of process connection flanges.

PROBLEM

It is a problem to provide a single flow tube Coriolis flowmeter that operates satisfactorily over a wide range of variations in the operating parameters of the flowmeter. These parameters include operating temperature, the density of the material flow as well as the material pressure and flow rate. A change in material density, thermally induced stress in the flow tube, or pressure stress on the flow tube can each result in an unbalanced condition which effects the accuracy of the flowmeter. Changes in these parameters degrade the static and dynamic isolation of the vibratory elements of the flowmeter. The problem is to keep the vibratory elements immune from the effects of changes in operating parameters. The accelerations that result from the change in operating parameters impair flowmeter accuracy by adding to or subtracting from the Coriolis acceleration of the material. The unwanted accelerations cannot be compensated for because they vary with the mounting conditions of the flowmeter. In addition, the mounting conditions often change with time and temperature in unknown ways.

Even though a variation of the material parameters and mounting conditions is to be expected, it is desired that the flowmeter remain operational and produce accurate output information. It is also desired that the structural integrity of the flowmeter elements be maintained as these parameters vary. It is a goal to design a Coriolis flowmeter so that it operates with suitable accuracy and does not destroy itself as the flowmeter elements are subject to varying operating temperatures. Flowmeter designers also desire that the flowmeter calibration will remain constant and flat over a reasonably wide range of material densities.

In order to achieve these design objectives, a Coriolis flowmeter must have a dynamically balanced vibrating structure that operates in a controlled and predictable manner over a range of operating parameter variations. The flowmeter elements external to the vibrating system should not vibrate or communicate vibration to the vibratory system. A Coriolis flowmeter often comprises a single straight flow tube surrounded by a balance bar and brace bars coupling the balance bar ends to the flow tube. In operation, vibration nodes (regions of no vibration) occur between the flow tube and the balance bar. The nodes define the length of the flow tube that is subject to Coriolis force. The vibration nodes of the flow tube and the surrounding balance bar should remain in the brace bars over the range of parameters for which the flowmeter is designed. Since the balance bar, brace bar, and flow tube comprise a dynamically balanced system, the vibrating mass times the vibration velocity of the balance bar should equal the vibrating mass times the vibration velocity of the flow tube. As long as these conditions are met, and no other unbalanced forces or torques are applied to the non-vibratory elements of the flowmeter, the vibration nodes remain in the brace bars and the other flow meter elements remain free from vibration. However, prior art attempts have all fallen short of meeting these conditions.

A prior art attempt to minimize node movement and the communication of vibration from the case to the vibratory system is shown in the U.S. Pat. No. 5,473,949 to Cage. This patent discloses a straight tube Coriolis flowmeter having a flow tube and a surrounding balance bar coupled by brace bars. The design is unique in that each brace bar also comprises a portion of each case end of the flowmeter. This geometry uses the mass of the case to keep the vibration nodes near the brace bar. For instance, a high density material in the flow tube causes the vibration nodes to move very slightly into the active portion of the flow tube with the result that the brace bars and case ends (and case) move in phase with the balance bar. Momentum is conserved since the mass times velocity of the case plus the mass times the velocity of the balance bar equals the mass times velocity of the flow tube. A low density material causes the node to move slightly into the balance bar with the result that the case moves in phase with the flow tube and momentum is once again conserved. The problem with the Cage design is that momentum is conserved by the case moving with the light member. The vibration is of small amplitude because the case is massive, but it is still large enough that different mounting conditions can effect the accuracy of the meter.

Another example of a prior art flowmeter that attempts to minimize unwanted accelerations is shown in U.S. Pat. No. 5,365,794 to Krohne. This patent discloses a flow tube surrounded by a concentric balance bar and distinct brace bars that couple the balance bar ends to the flow tube. In this design the balance bar ends are not connected to the case as in the Cage design. Furthermore, the inactive portion of the flow tube, external to the brace bar regions, is not connected to any of the support structure except by the tube ends that are connected to the flange faces. This structure operates satisfactorily as long the ratio of the vibration amplitude of the flow tube divided by the vibration amplitude of the balance bar does not vary from its design point. At the design point, the torque applied to the brace bars by the flow tubes is equal and opposite to the torque applied to the brace bars by the balance bar. The result is that the inactive portions of the flow tube are indeed inactive and remain on the axis of the meter. The problem arises when the material density changes. A high density material causes the vibration amplitude ratio to change. To conserve momentum the vibration amplitude of the heavy flow tube decreases while the vibration amplitude of the balance bar increases. The change in amplitude ratio causes the torques at the brace bar to become mismatched. The higher amplitude balance bar applies more torque to the junction than the lower amplitude flow tube. The inactive portion of the flow tube makes up the torque difference and bends as a result. Unfortunately, the translation increases the amplitude of the heavy flow tube and makes the balance worse. Ultimately, the flow tube (containing the high density material) ends up vibrating in phase with the case and the vibration nodes move far from their balanced locations and the meter accuracy suffers.

EPO patent 0,759,542 by Oval (FIGS. 8A and 8B of EPO patent 0,759,542) provides a Coriolis flowmeter having a straight flow tube surrounded by a concentric balance bar whose ends are coupled by case connect links to the inner wall of a case. The flow tube ends are coupled to end flanges. This structure provides dual connection points at each end of the flowmeter between the balance bar/flow tube and the case structure including the end flanges. The case connect link design uses the mass of the case to help reduce the movement of the end nodes (as in the Cage design). However, large changes in the amplitude ratio cause torque unbalance at the brace bars (like the Krohne design) and bending in the inactive regions of the flow tube. While the vibration is less than with the other prior art, it is still sufficient to degrade the meter performance.

It can therefore be seen from the above that it is a problem of prior art to provide a Coriolis flowmeter structure for which a shift of the material density does not degrade the static and dynamic isolation of the flowmeter's vibratory system and the corresponding reduction in the accuracy of the meter.

It is also a problem in the manufacture, balancing and testing of a Coriolis flowmeter to minimize the number of Coriolis flowmeters of a given model that must be maintained in inventory. The reason for this is that there are more than twenty different types of end flanges that may be coupled to each size of flowmeter. There are perhaps eight different sizes of flowmeter resulting in 120 different meters that need to be stocked in order to have rapid response to sales orders. At a cost of several thousand dollars each, the amount of money tied up in inventory can be significant. It is desired that flowmeters be of such a design that they can be balanced, and tested before the flanges are attached. This would enable the stocking of far fewer finished meters without flanges. The desired flanges would be welded on with the receipt of each order. Of the prior art meters, only the Cage design would be functional without flanges and it has balance problems. The other two prior art designs require that the tube end be welded to the flange in order to provide the dynamics of the finished meter.

SOLUTION

The above problems are solved and an advance in the art is achieved by the present invention. In accordance with the present invention, three separate connection points are provided at each end of the flowmeter between the vibrating structure and the flowmeter case including the end flanges. A first such connection point is in the end flange where the flow tube end is joined to the end flange. A second connection point is provided by case connect links which couple the balance bar ends to the inner wall of the case.

The third connecting point in each end of the flowmeter is provided by a circular element termed a cone connect. This third connection point is provided by bonding (usually brazing) the flow tube to the cone connect element at the flow tube location where it extends through an opening in the case end and projects axially outward towards the flow tube end. This cone connect connection is, like the other two connections, of limited length in the direction of the tube axis. There is a length of unsupported flow tube between the flange connection and the cone connect and another length of unsupported flow tube between the cone connect and the case connect links. Since these unsupported portions of the flow tube are not coupled to any other structure, a void surrounds these portions of the flow tube. The outermost void (in the neck of the flange) allows the welding of a flange to the case end at this location without overheating or stressing the flow tube. Also, the amount of heat required to effect a weld at these two locations is far less than would be required if the entirety of this portion of the flow tube was thermally coupled to the entire structure between the end flange and the case end.

The provision of three points of coupling at each end of the flow tube to the supporting structure of the flowmeter minimizes the communication of vibrations to the vibratory structure of the flowmeter that are generated by extreme conditions of parameters such as material density. It does this by the use of the case connect links to enable vibration amplitude ratio balancing and it uses the cone connect element to keep unbalanced torque away from the vibratory structure of the flowmeter. The reduced communication of vibrations to the vibratory structure of the flowmeter increases the accuracy and reduces the effect that different mounting conditions have on the flowmeter.

It is a further feature that the flowmeter of the present invention is manufactured, tested, and balanced prior to the time that the end flange is actually attached. At this stage of completion, the internal elements of the flowmeter are fully operational and are sealed or isolated by the cone connect element. The end portions of the flow tube extend axially outward from each of the case ends and their cone connect elements. Because the case is sealed and the flow tubes are rigidly affixed to the case ends, the tube ends may be temporarily coupled to a source of material flow at this time. The flowmeter may then be balanced. The flowmeter may be indefinitely stored in this state until an order is received from a customer. Then, the needs of the customer and the details of the end flanges required by the customer are made known and the appropriate end flanges may be coupled to the flow tube projections and the case ends by suitable welding operations.

The balancing and testing and subsequent temporary storage of the flowmeter prior to it being connected to end flanges is advantageous in that it minimizes the inventory that otherwise would have to be maintained by a supplier. If finished flowmeters were required to be stored with over twenty known types of flanges, the inventory would have to be enormous.

An alternative embodiment of the invention provides a case connect link that is not directly connected at its ends between the balance bar and the inner wall of the case. Instead, the case connect link has a bend in its central portion and has its outer end connected to a flat surface of the cone connect element. In this second embodiment, the cone connect link is circular as in the first embodiment but has a larger diameter with the outer circumference of this circular cone connect element engaging the inner circular surface of the flowmeter case end. By this means, the case connect link has sufficient rigidity to prevent relative motion between the balance bar ends and the inner wall of the case. At that the same time, due to the bend in the case connect link, the case connect link is able to flex and accommodate changes in the diameter of the balance bar due to thermal changes. The circular cone connect element functions as before described in that it has an opening in its center portion through which the flow tube extends. It differs in that the large outer diameter of the cone connect allows relative axial movement between its outer and inner connection points. This compliance can lower the thermal stress in the flow tube. The cone connect element of this embodiment, like the previous embodiment, also has sufficient rigidity in the radial direction to terminate the dynamic portion of the flow tube and allow balancing prior to flange welding. It also seals the case interior from the environment It can therefore be seen from the above that the present invention is advantageous in that it provides a flowmeter structure that maintains the dynamic isolation of the vibratory system of the flowmeter. It further permits the flowmeter to be tested, balanced, and stored in a state in which it is devoid of a flange; the flange being installed only when the specific model of flange required by the customer is known.

An aspect of the invention includes:

A Coriolis flowmeter having a flow tube and a balance bar that are adapted, when in use, to be vibrated in a driven plane in phase opposition to generate a Coriolis response in said vibrating flow tube representing information pertaining to material flowing through said vibrating flow tube, a case enclosing said flow tube and said balance bar with said balance bar being substantially parallel to and surrounding said flow tube;

a first and a second end of said case;

an opening in each of said case ends for receiving end portions of said flow tube that project beyond said case ends;

said opening in said case ends is coaxial with a longitudinal axis of said flow tube;

brace bar means coupling ends of said balance bar to said flow tube;

case connect link means having a first end coupled to said brace bar as well as to said balance bar and having a second end coupled to an inner wall of said case;

said case connect link means is effective to inhibit the movement of said brace bar and said balance bar ends in a direction perpendicular to said longitudinal axis of said flow tube in said driven plane;

a cone connect means having an outer circumference coupled to said case end and having a circular opening coaxial with said flow tube for sealably receiving said flow tube; and said cone connect means being axially positioned between a terminus of said flow tube and said case connect link means.

Another aspect comprises:

a cylindrical neck of said case end extending axially outward from said case end;

said neck has a center opening coaxial with said flow tube and a cylindrical inner surface that surrounds a portion of said flow tube that projects beyond said case end;

said cylindrical inner surface of said neck has a greater diameter than the diameter of said flow tube; and a circular cavity in said neck defined by the space between said flow tube and said cylindrical inner surface of said neck.

Another aspect includes an out of plane bend in a planar surface of said case connect links.

Another aspect is that said circular cone connect means has a flat surface having an out of plane bend to permit a change in the effective diameter of said circular cone connect means in response to changes in the diameter of the portion of said case end to which said cone connect means is coupled.

Another aspect is that said coupling of second end of said case connect link means comprises a connection of said second end of case connect link means to said inner wall of said case.

Another aspect is that said second end of said case connect link means is coupled to said wall of said case by an intermediate connection means that is connected to said inner wall of said case.

Another aspect is that said intermediate connection means includes a surface of said cone connect means whose perimeter is connected to a surface of said inner wall of said case.

Another aspect is that a driver that vibrates said flow tube and said balance bar in a drive plane in phase opposition to each other;

said vibrations in said drive plane and said material flow are jointly effective for inducing Coriolis deflections in said flow tube;

pick off means coupled to said flow tube that detect said Coriolis deflections;

said pick off means generate signals representing information pertaining to said material flow in response to said detection of said Coriolis deflections; and meter electronics that receive said signals from said pick off means and generates output information pertaining to said material flow.

Another aspect is that said flow tube extends at a constant diameter for the length of said case and has said ends portions that project through said opening in said cone connect means at said constant diameter to said terminus of said flow tube.

Another aspect is that said terminus of each said end portion of said flow tube is devoid of attachment to any other structure.

Another aspect includes an end flange coupled to said terminus of each said end portion of said flow tube for enabling said Coriolis flowmeter to be coupled to a pipeline;

a raised element having a circular opening on an axial end of said flange, and walls of said center opening that sealably engage said flow tube.

Another aspect includes a sealed cavity defined by space between the outer surface of said end portion of said flow tube and said inner cylindrical surface of said neck of said case end and a cylindrical inner surface of a portion of said end flange;

said sealed cavity having an axially outer end comprising opening of said raised element of said end flange sealably engaged with said flow tube;

said sealed cavity having an axially inner end comprising said opening in said cone connect means that is in sealable engagement with said flow tube.

Another aspect includes a sealed cavity defined by space between the outer surface of a portion of said flow tube and an inner cylindrical surface of said neck of said case end and a cylindrical inner surface of a neck of said end flange;

said sealed cavity has an axially outer end comprising said raised element of said end flange that is sealably engaged with said flow tube;

said sealed cavity has an axially inner end comprising said opening in said cone connect means that is sealably engaged with said flow tube.

Another aspect includes an end flange;

a neck of said end flange having a first end comprising said end flange and having second end connected to an axially outer end of said neck of said case end;

a cylindrical opening in said end flange and in said neck of said end flange for receiving said terminus of said end portion of said flow tube;

said cylindrical opening in said neck of said end flange and in a portion of said end flange has a diameter that is substantially greater than the exterior surface of said flow tube to define a void between said exterior surface of said flow tube and said cylindrical inner surface of said neck of said end flange and a cylindrical inner surface of said portion of said end flange; and a raised element having a center opening in an axially outer portion in said end flange that has an inner diameter for sealably receiving the terminus portion of said flow tube.

Another aspect includes said case includes walls parallel to the longitudinal axis of said flow tube;

said case further includes said case ends which are affixed to ends of said walls and are oriented substantially perpendicular to said cylindrical walls;

the exterior surfaces of said case ends include a circular lip coaxial with said opening in said case ends for defining said cone connect means and for receiving said portion of said flow tube that projects beyond said case ends;

said case ends further including a neck having a cylindrical inner surface of a greater diameter than the exterior surface of said flow tube to define a void comprising the space between said exterior surface of said flow tube and said inner surface of said neck.

Another aspect includes an end flange coupled to said terminus of said flow tube for enabling said Coriolis flowmeter to be coupled to a pipeline.

Another aspect includes cylindrical walls oriented parallel to the longitudinal axis of said flow tube; said case ends are curved and offset from perpendicular with respect to said cylindrical walls;

an inner surface of a curved portion of said case end includes means that receives the outer extremity of said circular cone connect means;

said flow tube extends the length of said case and has said end portions that extend through a center opening of said cone connect means and through said cavity of said neck of said case end to a flow tube terminus axially beyond said neck.

Another aspect is that said terminus of said flow tube is devoid of attachment to any other structure.

Another aspect is that an end flange coupled to said terminus of said flow tube for enabling said Coriolis flowmeter to be coupled to a pipeline.

Another aspect includes cylindrical walls oriented parallel to the longitudinal axis of said flow tube;

said case ends have a curved portion that is offset from perpendicular with respect to said cylindrical walls;

an inner surface of an axial inner portion of said case end has a diameter equal to the inner diameter of said case for receiving the outer extremity of said circular cone connect means;

said flow tube extends the length of said case and has said end portions that extend through a center opening of said cone connect means and through said cavity of said neck of said case end to a flow tube terminus axially beyond said neck.

Another aspect is that said terminus of each said end portion of said flow tube is devoid of attachment to any other structure.

Another aspect includes an end flange coupled to said terminus of said flow tube for enabling said Coriolis flowmeter to be coupled to a pipeline.

Another aspect is that said Coriolis flowmeter further includes:

an end flange;

a cylindrical opening in said end flange for receiving said terminus of said end portion of said flow tube;

a neck of said end flange having a first end integral with an axially outer portion of said end flange and having an axially inner end connected to an axially outer end of said neck of said case end;

said end flange and said neck of said end flange both have a cylindrical inner surface coaxial with said flow tube;

said cylindrical inner surface opening in said neck of said end flange as well as in an axially inner portion of said end flange has a diameter that is substantially greater than the exterior surface of said flow tube to define a void between said exterior surface of said end portion of said flow tube and said cylindrical inner surface of said neck of said end flange and said axially inner portion of said end flange; and an axially outer portion of said cylindrical opening in said end flange defines a raised element that has a diameter approximate that of said flow tube diameter for sealably receiving the terminus of said flow tube.

Another aspect is that said case connect link comprises:

a flat elongated member having a bend in a mid portion of said member to define two legs of said member that are angularly oriented with respect to each other;

an outer end of a first one of said legs being connected to an end of said balance bar;

an outer end of a second one of said legs being connected to a surface of said cone connect means to define a series path connecting said end of said balance bar with said inner wall of said case;

said series path comprises said first and second legs of said case connect link and a portion of said cone connect means.

Another aspect includes said two legs are oriented substantially 90 degree with respect to each other;

Another aspect is that said terminus of said flow tube is devoid of attachment to any other structure.

Another aspect includes an end flange coupled to said terminus of said flow tube for enabling said Coriolis flowmeter to be coupled to a pipeline.

Another aspect is that said case connect link comprises:

a flat elongated curvilinear member;

an outer end of a first one of said legs being connected to an end of said balance bar;

an outer end of a second one of said legs being connected to a surface of said cone connect means to define a series path connecting said end of said balance bar with said inner wall of said case;

said series path comprises said case connect link and a portion of said cone connect means.

Another aspect is that said case connect link comprises:

an elongated member having at least one bend;

an inner end of said elongated member is connected to an end of said balance bar;

an outer end of said elongated member is connected to a surface of said cone connect means to define a series path connecting said end of said balance bar with said inner wall of said case;

said series path comprises said case connect link and a portion of said cone connect means.

Another aspect includes a method of forming a Coriolis flowmeter having a flow tube and a balance bar that are adapted, when in use, to be vibrated in a driven plane in phase opposition to generate a Coriolis response in said vibrating flow tube representing information pertaining to material flowing through said vibrating flow tube, said method comprising the steps of:

enclosing said flow tube and said balance bar in a case with said balance bar being substantially parallel to said flow tube;

said case having first and a second ends;

including an opening defining a cone connect in each of said case ends for receiving end portions of said flow tube that project beyond said case ends;

sealably coupling said opening in said cone connect to said flow tube;

coupling ends of said balance bar to said flow tube with brace bar means;

coupling said brace bar and said balance bar to an inner wall of said case with case connect link means;

said case connect link means is effective to inhibit the movement of said brace bar and said balance bar ends in a direction perpendicular to a longitudinal axis of said flow tube in said driven plane;

forming a cylindrical neck on said case end having a center coaxial with said flow tube and extending axially outward from said case end;

said neck surrounds said end portion of said flow tube that projects beyond said case end and has an inner cylindrical surface of a greater diameter than the diameter of said flow tube;

forming a circular cavity in said neck is defined by the space between the outer surface of said end portion of said flow tube and said cylindrical inner surface of said neck;

extending said flow tube at a constant diameter for the length of said case so that said ends portions of said flow tube project through said opening in each case end at said constant diameter to a terminus beyond each said case end; and said terminus of each end portion of said flow tube is devoid of attachment to any other structure.

Another aspect includes the step of:

affixing an end flange to said terminus of said flow tube to enable said Coriolis flowmeter to be coupled to a pipeline.

DESCRIPTION OF THE DRAWINGS

The above and other objects and advantages of the invention may be better understood from a reading of the following detailed description thereof taken in conjunction with the drawings in which.

DETAILED DESCRIPTION

Figure 1:
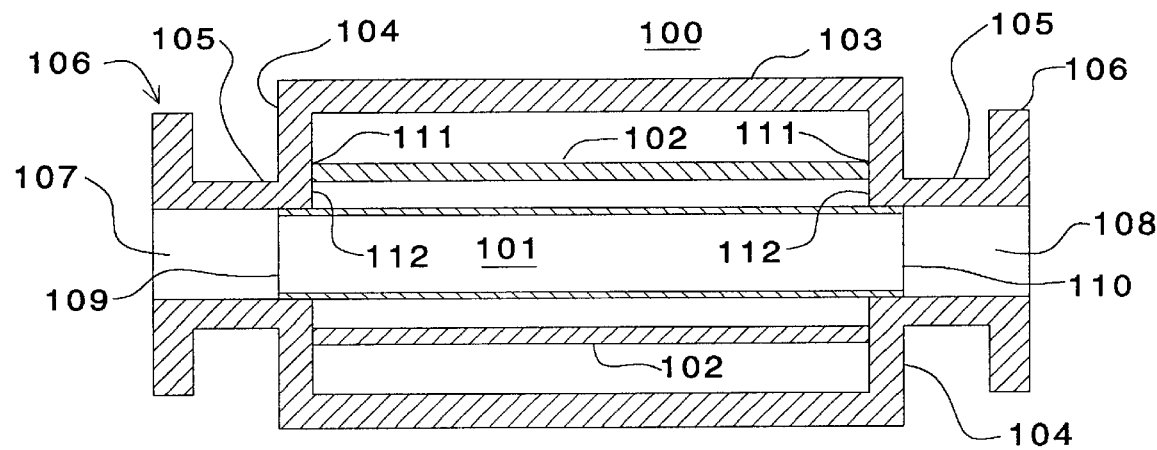
FIGS. 1, 2, 3, 4, and 5 illustrate prior art Coriolis flowmeters.

Description of FIG. 1

FIG. 1 discloses Coriolis flowmeter 100 of the U.S. Pat. No. 5,473,949 to Cage. It is of the straight tube type and has a case 103 enclosing a balance bar 102. The balance bar is cylindrical and encloses flow tube 101. Case 103 has end elements 104 coupled by neck elements 105 to input and output flanges 106. Element 107 is the input to the flowmeter; element 108 is the output. Flow tube 101 has an input end 109 connected to an opening in case end 104 at element 112 which is the brace bar portion of case end 104. Brace bar portion 112 is coupled to neck element 105. On the right side, the output end 110 of flow tube 101 is coupled to the case end 104 at location 112 where case end 104 joins neck element 105.

In operation flow tube 101 and balance bar 102 are vibrated in phase opposition by a driver (not shown). With material flow, the vibration of flow tube 101 induces a Coriolis response in flow tube 101 that is detected by velocity sensors (not shown). The phase displacement between the velocity sensors represents information pertaining to the flowing material. The signal output of the velocity sensors is applied to electronics circuitry that processes the signals to derive the desired information pertaining to the material flow.

It is necessary that a Coriolis flowmeter provide accurate material flow information over a wide range of operating conditions including materials of different density, temperature and viscosity. In order to achieve this, it is necessary that the vibration of the vibrating structure of the flowmeter be stable over this range of conditions. In order to achieve this stability it is necessary that the flowmeter vibrations be isolated to the flow tube and balance bar elements. The reason for this is that vibration external to the vibratory system imposes additional accelerations on the material besides the Coriolis acceleration that is used to determine the flow rate of the material. External vibration also moves the nodes defining the active length of flow tube. The resulting acceleration is variable and subject to unknowable parameters such as mounting stiffness. The undesired additional vibration of the vibratory structure of the flowmeter therefore impedes the ability of the flowmeter to provide accurate output information regarding the material flow.

For the flowmeter of FIG. 1, the vibrating system includes balance bar 102 and flow tube 101, which are vibrated in phase opposition. These two elements comprise a dynamically balanced structure in which the ends 111 of balance bar and ends 109 and 110 of the flow tube are coupled by brace bar portion 112 of case end 104. This is undesirable since the processing of materials of different densities may cause the vibration amplitude of the balance bar 102 and the flow tube 101 to vary.

Figure 2:
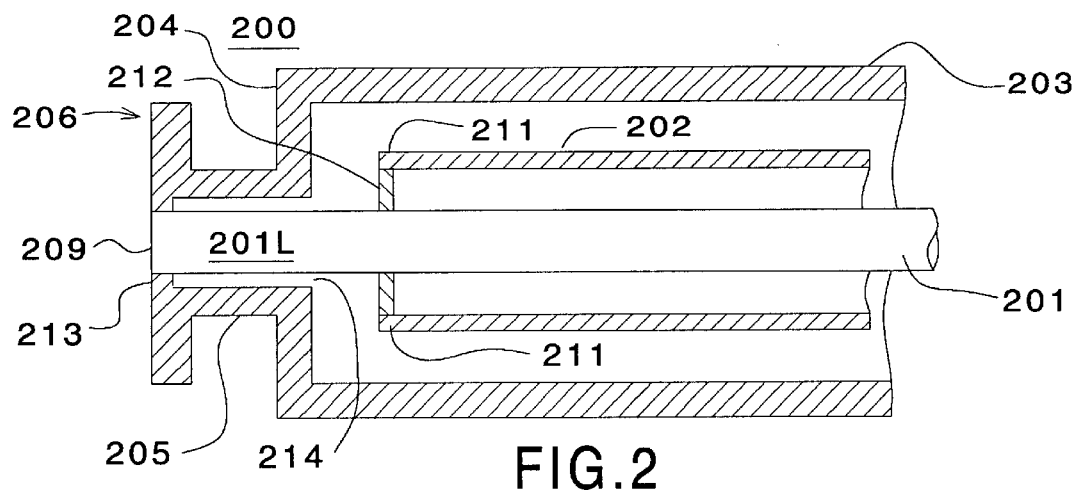

Description of FIG. 2

FIG. 2 discloses the Coriolis flowmeter of U.S. Pat. No. 5,365,794 to Krohne (FIG. 2 of U.S. Pat. No. 5,365,794). This patent discloses Coriolis flowmeter 200 having a case 203 containing a flow tube 201 and a surrounding balance bar 202. Case 203 has a case end 204 that is coupled by a neck element 205 to end flange 206. Flow tube 201 extends through the entirety of the case and is coupled at its end 209 to portion 213 of end flange 206. Immediately to the right of flange portion 213, is a void 214, which separates the inner wall of neck element 205 from the outer surface of flow tube 201.

The flowmeter of FIG. 2 differs from that of FIG. 1 in that it includes distinct brace bar 212 which couples the ends 211 of balance bar 202 to the outer surface of flow tube 201. In the flowmeter of FIG. 2, the dynamically balanced vibrating system is balance bar 202, brace bar 212 and the flow tube 201. A node (point of no vibration) normally resides in each brace bar 212. Under these conditions the meter is processing a material flow of a density for which the meter was designed and calibrated. The vibration amplitude of the balance bar 202 times its mass is then equal to the vibration amplitude of the material filled flow tube 201 times its mass. When the flowmeter encounters materials of a higher density, the vibration amplitude of the flow tube decreases and the vibration amplitude of the balance bar increases. Similarly, when materials of a lower density are encountered, the vibration amplitude of the flow tube increases and the vibration amplitude of the balance bar decreases. As the vibration amplitude ratio changes, the longitudinal axis of flow tube sections 201L exits brace bar 212 at an angle to the flow meter. Under these conditions the balance bar applies a greater bending torque to the brace bar region than the flow tube. The bending causes the case to translate downward (in phase with the heavy flow tube) while the brace bar regions translate upward (in phase with the balance bar). These translations, as explained above can impair the accuracy of the flow meter. The unbalanced torque can also stress the meter elements and in extreme cases, it can result in a shortened life or destruction of the flowmeter.

Figure 3:
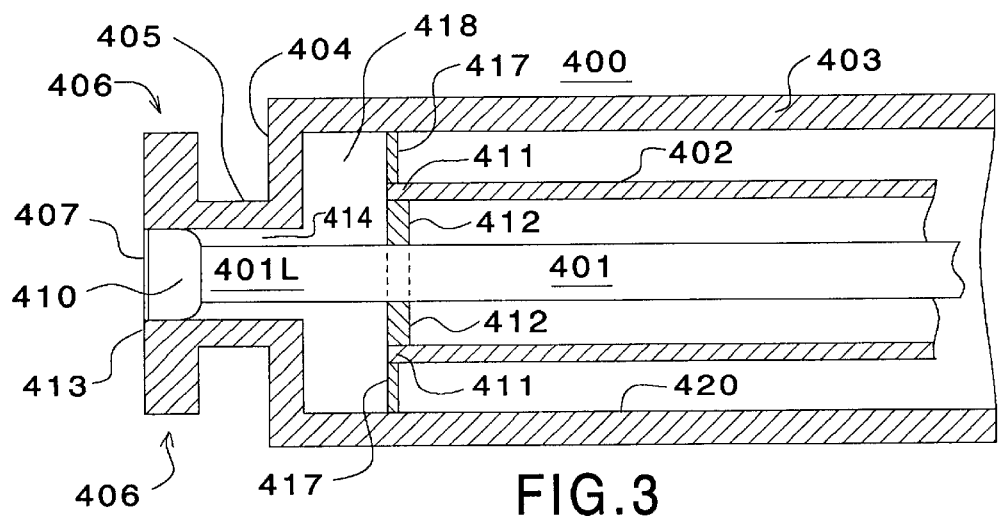
Figure 4:
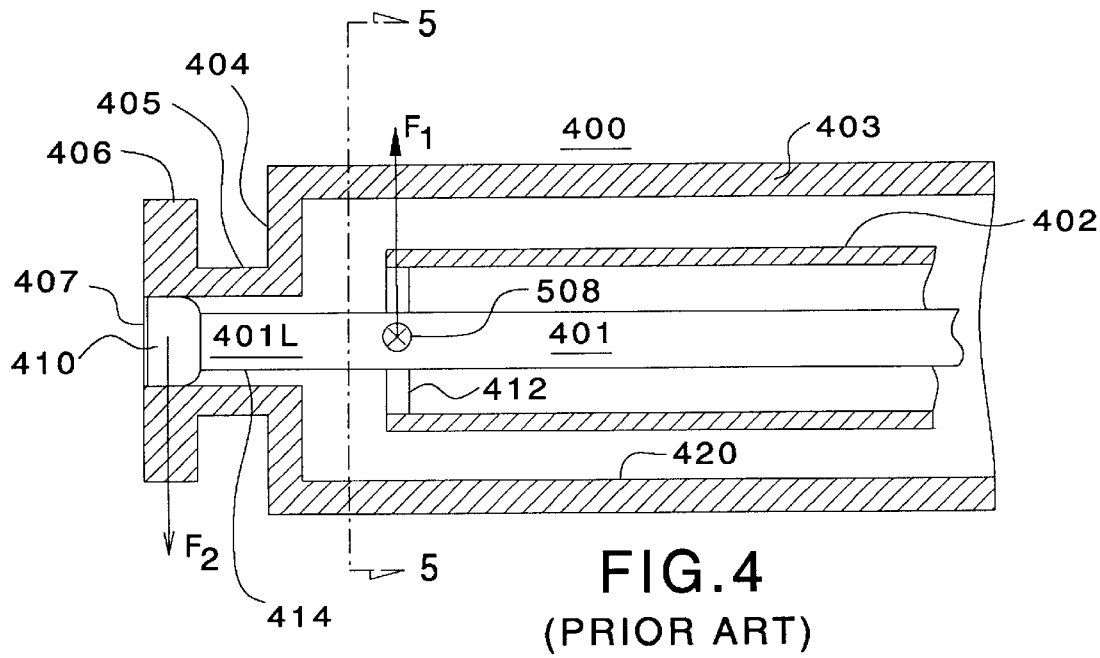
Figure 5:
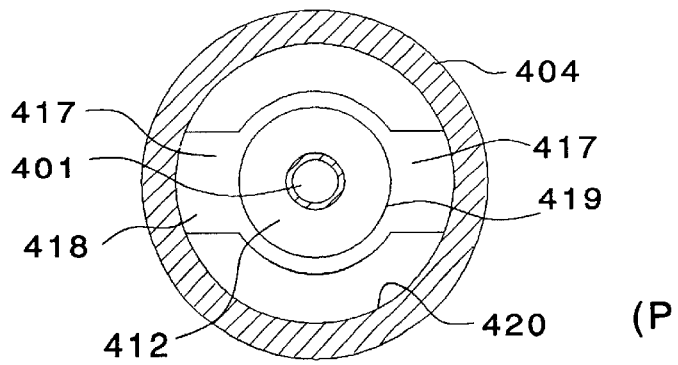

Description of FIGS. 3, 4, and 5

FIGS. 3, 4, and 5 show a left portion of the flowmeter of EPO Patent EP 0 759 542 A1 (FIG. 8b of EPO Patent EP 0 759 542 A1). The flowmeter of FIG. 3 is similar to that of FIG. 2 in that it has a case 403, a case end 404, a case neck 405 and end flanges 406. Case 403 encloses flow tube 401 which is surrounded by balance bar 402. Brace bars 412 couple balance bar end 411 to flow tube 401. The flow tube end 407 is connected by flow tube end portion 410 to portion flange element 413 which is a part of flange 406. The flowmeter of FIG. 3 is similar to that of FIG. 2 in that it has a void 414 between the exterior surface of flow tube portion 401L and the inner wall of neck 405 connecting case end 404 to end flange 406.

The flowmeter of FIG. 3 differs from that of FIG. 2 in that flow tube end element 410 is larger in diameter than flow tube 401. The change in diameter between flow tube element 410 and flow tube 401 serves the purpose of relieving thermal stresses in the flow tube. Another distinction between the flowmeter of FIG. 3 and that of FIG. 2 is that the flowmeter of FIG. 3 has case connect link elements 417 each of which has a first end 418 coupled to an inner wall 420 of case 403 and a second end coupled to the end 411 of balance bar 402.

Case connect links 417 overcome some of the vibration problems described for the flowmeter of FIG. 2. The flowmeter structure of FIG. 2 permits the ends of the balance bar 202 and brace bar 212 to vibrate with respect to the inner wall of case 203. This is prevented in the flowmeter of FIG. 3 since case connect links 417 provide a rigid connection between the balance bar ends 411 and the inner wall 420 of case 403. In such structures, the location where the case connect links 417 join to the balance bar end acts as a pivot point 508 for the vibrations of flow tube 401 and balance bar 402. Thus the balance bar end cannot translate with respect to the inner wall of case 403 by virtue of the connection between the two elements provided by case connect links 417. However, as shown in FIG. 4, balance bar 402, flow tube 401 and brace bar 417 can become a dynamically unbalanced structure when materials having a significantly higher or significantly lower density than normal are processed. The change in amplitude ratio of the elements to the right of pivot point 508 can apply an undesirable torque to portion 401L of the flow tube 401 resulting forces F1 and F2.

FIG. 5 is an end view of the flowmeter structure of FIG. 4 taken along line 5—5 of FIG. 4. FIG. 5 shows flow tube 401 brace bar 412, case connect links 417 having outer ends 418 connected to the inner wall 420 of case 403 and an inner end 419 connected to the outer extremity of brace bar 412. Case connect links 417 are flat strips. FIG. 3 is a top view of a section of flowmeter 400; FIG. 4 is a side section view.

Figure 6:
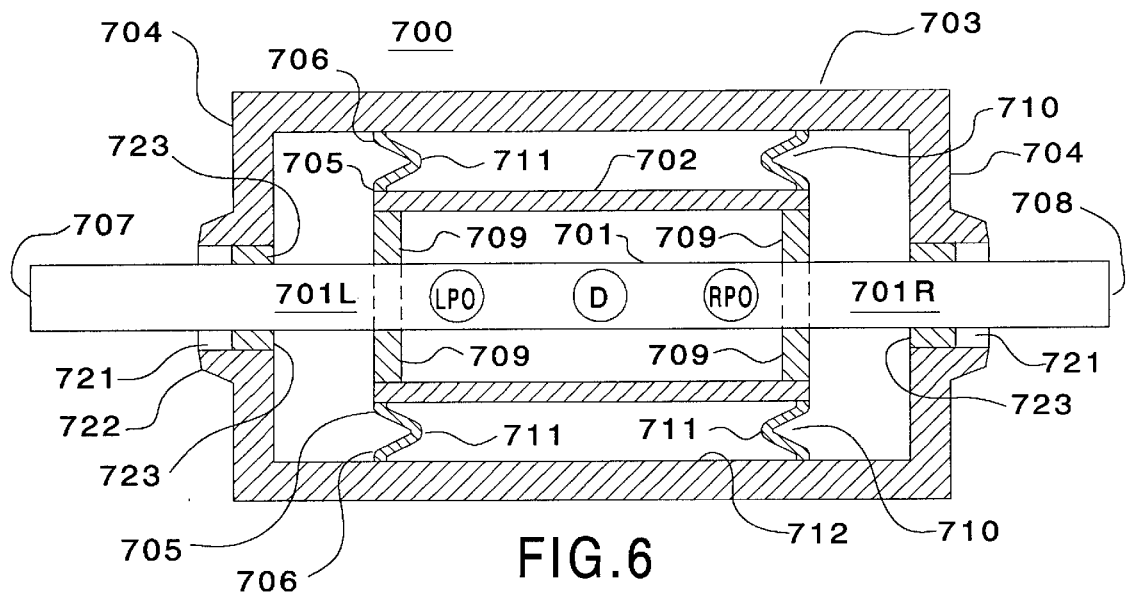
FIG. 6 illustrates a first preferred exemplary embodiment of the present invention.

Description of FIG. 6

FIG. 6 discloses one possible exemplary embodiment of the invention as comprising a flowmeter 700 having a case 703 that encloses the elements that comprise the vibrating system of the flowmeter. These elements include a balance bar 702 which surrounds a center portion of flow tube 701. Balance bar 702 is connected at its ends by a brace bars 709 to flow tube 701. The flow tube 701 includes extensions 701L at the input end and 701R at the output end of the flowmeter. These flow tube elements together comprise a single flow tube that extends at a constant diameter through the flowmeter 700. In so doing, flow tube 701 extends for the length of case 703, through case ends 704 and projects beyond case ends 704 to terminus 707 on the left and terminus 708 on the right. Element 707 may be considered to be the input end of the flow tube; element 708 may be considered to be the output end of the flow tube. The case ends 704 have a center portion 723 termed a cone connect having an opening through which tube portion 701L extends on the left and through which flow tube portion 701R extends on the right. Cone connect 723 sealably engages the exterior surface of flow tube elements 701L and 701R. Case end 704 has a thickness essentially the same as that of case 703. The radially center portion of the case ends 704 includes a lip 722. Lip 722 extends axially outward beyond the outer surface of case end 704 and its cone connect 723. The inner surface of lip 722 has a diameter that is essentially the same as the outer diameter of cone connect 723. The inner diameter of the lip of 722 and the outer diameter of the flow tube forms a void 721.

The ends of balance bar 702 are coupled by brace bars 709 to the outer surface of flow tube 701. Brace bars 709 form a path that permits balance bar 702, brace bars 709, and flow tube 701 to be a dynamically balanced system with the balance bars 702 and the flow tube 701 dynamically communicating with each other via brace bars 709. The ends of balance bars 702 are further coupled by means of case connect links 710 to the inner wall 712 of case 703. Case connect links 710 include a fold element 711. Case connect links 710 are coupled at their outer end 706 to the inner case wall 712 and at their inner end 705 to balance bar 702.

The case connect links 710 of FIG. 6 are similar to case connect links 417 on FIG. 3 in that they couple the ends 705 of balance bar 702 on FIG. 6 to the inner wall 712 of case 703. Their function is to prevent vibrations of brace bar 709 in a direction perpendicular to the tube axis in the drive plane of FIG. 6. The case connect links 710 serve to keep the unbalanced torques from moving the brace bar 709 with respect to the case. This enables the vibration amplitude ratio to change with density so as to keep the vibrating structure balanced. However, as distinguished from case connect links 417, case connect links 710 have an out of plane bend. Balance bar 702 and the case 703 can change in diameter with respect to each other in response to temperature differentials between these two elements. Bend 711 permits the effective length of case connect link 710 to change as the case diameter and the balance bar diameter attempt to expand or contract with respect to each other.

Driver D and a left velocity sensor LPO and a right velocity sensor RPO are shown coupled to flow tube 701 on FIG. 6. These elements are connected in a manner similar to that shown in greater detail on FIG. 7 to meter electronics element 801. Meter electronics 801 supplies a signal via path 803 to driver D to vibrate flow tube 701 to transversely at the resonant frequency of flow tube 701 with material flowing therein. The combined material flow and vibrations imparted to flow tube 701 by driver D induces a Coriolis response in flow tube 701 in a manner well known in the art. The phase difference between the signals of left velocity sensor LPO and right velocity sensor RPO represents information pertaining to the material flow. The output signals of the velocity sensors are applied as shown on FIG. 7 via paths 802 and 804 to meter electronics 801 which processes the received signals and generates output information on its path 815 pertaining the material flow.

Figure 7:
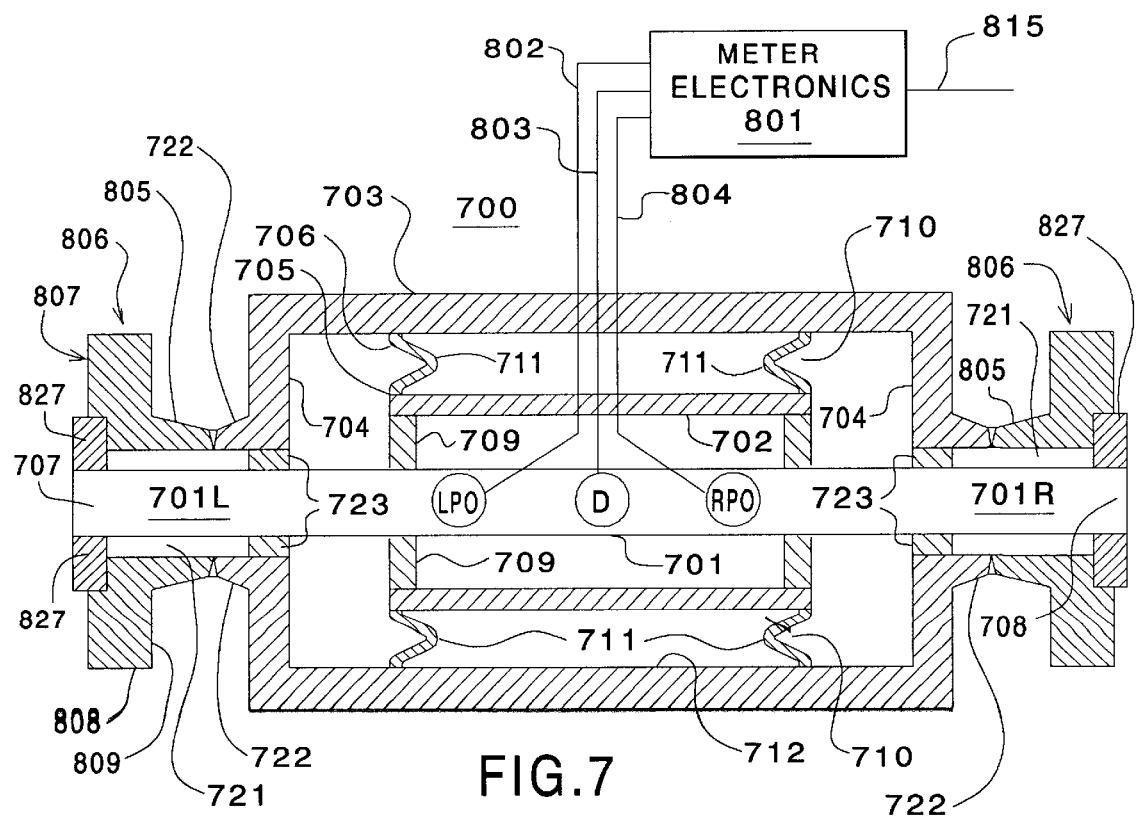
FIG. 7 illustrates another alternative exemplary preferred embodiment of the present invention.

It should be noted that the flow tube ends 707 and 708 are not connected to flange elements as is the case for flowmeter of FIG. 7. The flowmeter of FIG. 6 is manufactured, tested, and balanced without flanges being attached to the flow tube ends. The prior art meters of FIGS. 2 through 5 could not be balanced and tested prior to the flanges being attached because the tube end connections were critical to the dynamics of the vibrating structure. The cone connect elements 723 of the present invention remove the tube ends 707 and 708 from the dynamic structure of the meter and create a fully functional meter prior to the flange welding operation.

Suitable facilities are provided at the location at which the flowmeter of FIG. 6 is balanced and tested to permit the flow tube ends 707 and 708 to be coupled to a source of material to permit the balancing and testing to be accomplished. Once this testing and balancing is accomplished, the flowmeter of FIG. 6 may be stored until it is ready for delivery to a customer. The manufacture testing, balancing and temporary storage of the flowmeter of FIG. 6 without flanges is advantageous since there are many different types of flanges. It is economically advantageous to manufacture, balance, test, and store a flowmeter in its condition as shown in FIG. 6 until such time as a customer for the flowmeter is known and the type of flange desired by the customer is also known. At that time, the flanges desired by the customer are attached and the flow meter is equipped as shown in FIG. 7. It is advantageous to balance, test and store the flowmeter equipped as shown in FIG. 6 since it minimizes the inventory that a manufacture must maintain.

Description of FIG. 7

The flowmeter of FIG. 7 is identical to that of FIG. 6 except that the flowmeter of FIG. 7 includes flanges 806 affixed to the end portions 701L and 701R of flow tube 701. Flanges 806 include an outer end surface 807, an inner surface 809 parallel to outer surface 807, a neck 805 having an inner axial end surface which contacts a mating outer axial end surface of lip 722 of case end 704. Outer surface 807 of flange element 806 has a raised element 827 having a center opening whose walls sealably contact flow tube 701L at its inlet 707 and 701R at outlet 708. A void 721 is defined by the space between the exterior surface of flow tube 701 intermediate raised element 827 of flange 806 and lip 722 coupled to case end 704. Void 721 is advantageous in that it permits flange 806 to be coupled to case end 704 at lip 722. Since this coupling involves a heating operation, such as brazing or welding, flow tube 701L and 701R is subject to less thermal stress by virtue of the void 721. If the void 721 comprised solid material, the heat from the welding of the flange 806 to lip 722 could be conducted to and overheat the portions of flow tube flow tube 701L and 701R. This large amount of heat could alter the structure of the flow tube material, such as titanium, in such a way as to decrease its corrosion resistance. The heat of the weld could also partially melt the braze material in the joint between flow tube 701 and cone connect 723. This could harm the braze and could possibly affect the prior balancing and adjustment of flowmeter in its state of completion as shown on FIG. 6.

The flowmeter of FIG. 7 provides three connection points between flow tube 701 and case 703 near each end of flow tube 701. The first connecting point is that provided by the end flanges 806 which have the center opening of raised element 827 whose walls are bonded to flow tube ends 701L and 701R. The second connecting point is cone connect 723 of case end 704. The third connecting point is provided by brace bars 709 together with case connect links 710. These three connecting points affix flow tube 701 to the structural elements of flowmeter case 703.

The function of the connecting point comprising the case connection links 710 and the brace bar 709 is to minimize translations to the flow tube end nodes where they are coupled to brace bar 709. The function of the junction point provided by raised element 827 and the walls of its center opening is to seal the flow tube 701 to the flange 806 so as to prevent the material flow from entering case 703. The function provided by cone connect 723 is to provide a rigid termination for the dynamic portion of the flow tube. This connection applies to the case end the force generated by unbalanced torque at the brace bar region. The case and case end are rigid enough to withstand this force without significant bending. Moving the torque reaction force (FIG. 4) to the case end eliminates communication to the vibratory structure of the flowmeter. The intermediate connection also reduces stress on the junction between the flow tube ends 707 and 708 and raised element 827 and thereby increases reliability.

Figure 8:
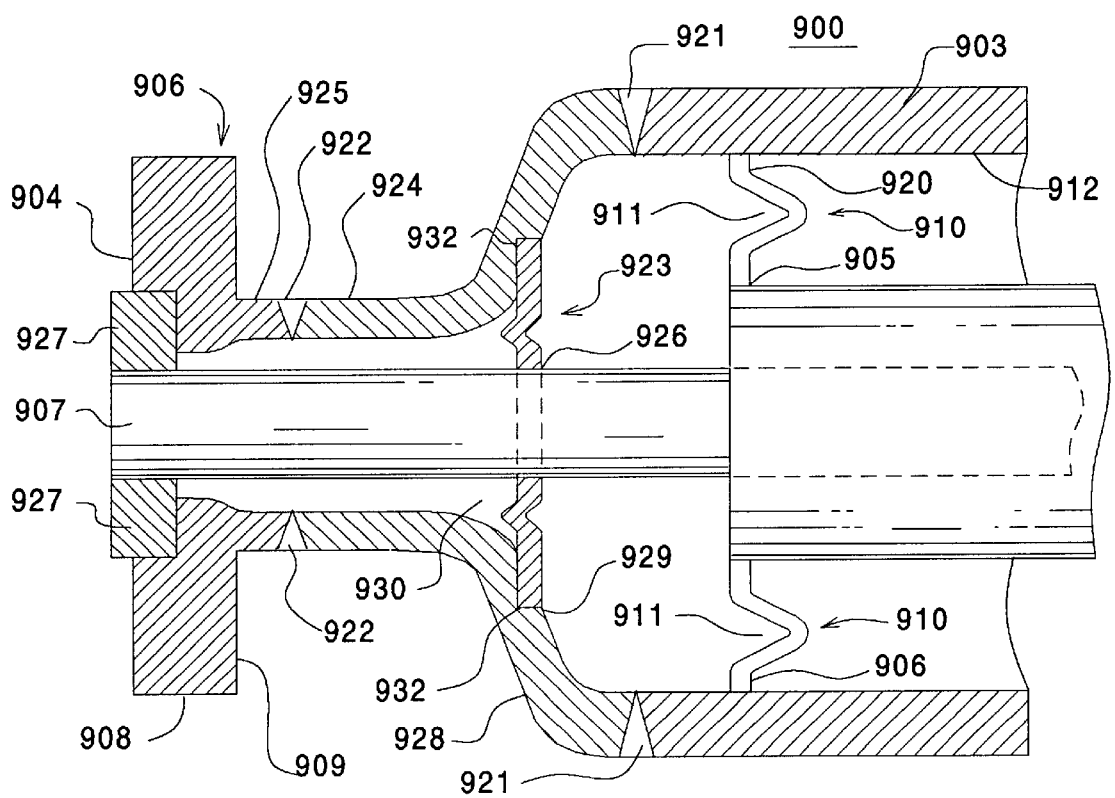
FIGS. 8 and 9 illustrate yet another preferred exemplary embodiment of the present invention.
Figure 9:
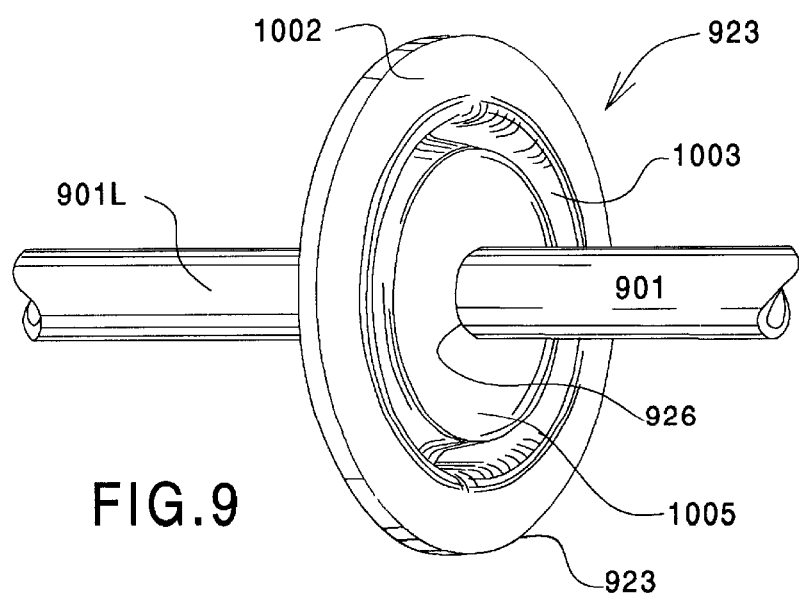

Description of FIGS. 8 and 9

FIGS. 8 and 9 disclose another possible exemplary embodiment of the invention. The embodiment of FIG. 8 is similar to that of FIGS. 6 and 7 in that the flowmeter 900 of FIG. 8 has case 903 that encloses a balance bar 902 and a flow tube 901. FIG. 8 discloses only a left portion of flowmeter 900 to minimize drawing complexity. Also, the driver D and the two velocity sensors LPO and RPO are not shown on FIG. 8 nor is the associated meter electronics. It is to be understood that the flowmeter of FIG. 8 includes a driver element D, a left velocity sensor LPO and a right velocity sensor RPO all of which are connected over appropriate conductors to a meter electronics element which applies a drive signal for the driver to vibrate the balance bar and flow tube and which receives the signals from the two velocity sensors, and processes them to generate material flow information for the material flowing through flow tube 901 as it is vibrated by the driver D (not shown).

In a manner similar to that shown on FIGS. 6 and 7, the left end of balance bar 902 is connected at junction 905 to the lower end of a case connect link 910 having a fold 911 with the outer end 920 of the case connect link 910 being connected to an inner wall 912 of case 903. Case connect link 910 performs the same function as that for case connect link 710 on FIG. 6. They similarly stabilize the vibrations of balance bar 902 and flow tube with respect to vibrations in the drive plane (perpendicular to the plane of the paper on which FIG. 8 is illustrated).

Flow tube 901 extends for the length of balance bar 902 and further extends axially through a disc like cone connect member 923 which is shown in detail on FIG. 9. Flow tube 901 extends through an opening 926 in cone connect member 923 and further extends as element 901 L to its input end 907 where it is connected by raised element 927 to flange 906. Flange 906 has an outer axial surface 904, an outer circumferential surface 908 and an inner axial surface 909.

Flange 906 has a neck 925 that is coupled by means of a weld 922 to a neck 924 of the end of case 903. Neck 924 is similar to lip 722 of the flowmeter of FIG. 6. The difference is that while the lip 722 of case end 704 is relatively small compared to case end 704, neck 924 of case end 928 projects axially towards surface 909 of end flange 906 a greater distance than does lip 721 of FIG. 6.

Void 930 defines the space between the exterior surface of flow tube 901L and the inner radial surfaces of neck 925 and neck 924. Void 930 serves the same function as does void 721 on FIG. 7; namely, it minimizes the heat that is conducted from the weld 922 to the flow tube 901L. This protects the flow tube 901L and the braze joint of opening 926 from the heat of the flange weld 922.

Cone connect member 923 is shown in further detail on FIG. 9 as comprising a circular element having an outer circumference 932 which is coupled to a notch in the inner surface 929 of case end 928. Cone connect member 923 has a flat surface 1002 adjacent its circumference 932. Near the radial mid point the surface 1002 becomes groove 1003 which, in turn, becomes a flat surface 1005 comprising the inner radial portion of cone connect 923. The center of flat surface 1005 has an opening 926 through which flow tube 901 extends with the flow tube and surface 1005 being coupled to one another. Groove 1003 enhances the ability of the cone connect 923 to accommodate differential expansion due to temperature differences between the flow tube 901 and the case 903. It also protects the completed flowmeter from excessive thermal axial stresses.

The structure comprising case 903 and end flanges 906 of flowmeter 900 are coupled to the flow tube at three points per end in the same manner as the flow tube of FIG. 7. The first point of coupling is that between raised element 927 and flow tube end 907. A second point of coupling is that between flow tube 901 and cone connect member 923. The third point of coupling is that provided by case connect link 910 between the inside surface of the case 903 and the end of balance bar 902. The end of balance bar 902 is in turn connected to flow tube 901 by the brace bar (not shown).

Figure 10:
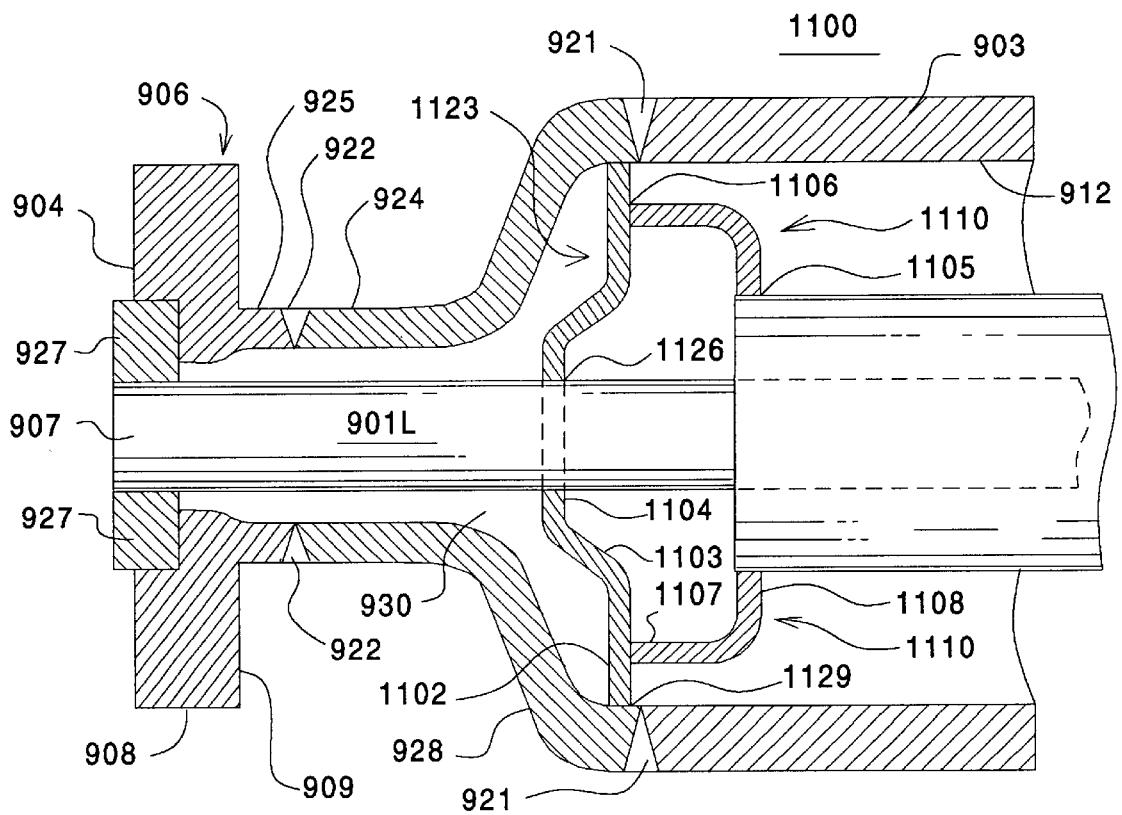
FIGS. 10 and 11 illustrate another preferred exemplary embodiment of the invention.
Figure 11:
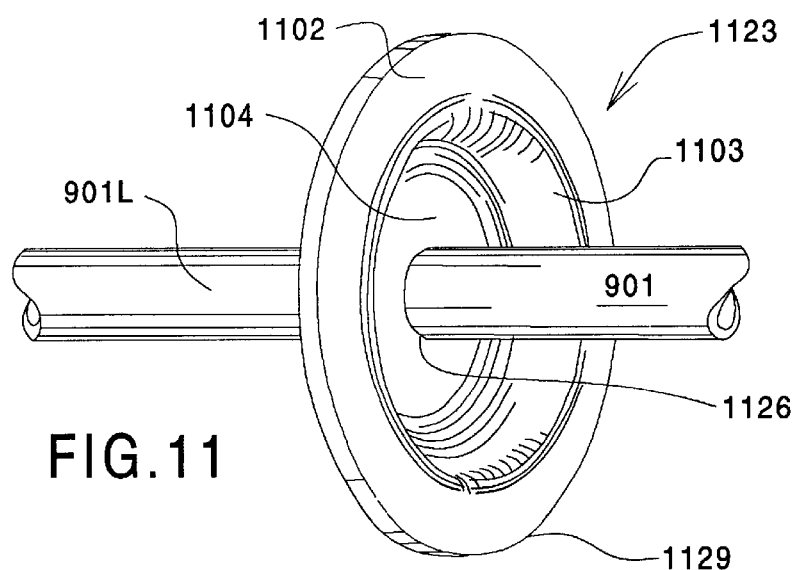

Description of FIGS. 10 and 11

FIGS. 10 and 11 disclose an alternative embodiment of the invention that is similar in many respects to that shown on FIGS. 8 and 9. The two embodiments are similar in most respects and differ only with respect to the details of the elements 923 and 910 on FIG. 8 which are the cone connect element and case connect links respectively. Corresponding elements on FIGS. 10 and 11 are designated 1123 and 1110 with 1123 being the cone connect element and with element 1110 being the case connect link.

The elements on FIGS. 10 and 11 that have reference numbers in the 900 series (i.e. 902, 903, . . . etc.) are identical to the corresponding numbered elements of FIG. 8 which have already been described in detail in connection with FIG. 8. The elements of FIG. 10 that differ from those on FIG. 8 are designated with reference numbers in the 1100 series (i.e. 1102, 1103 . . . etc.).

Cone connect element 1123 of FIG. 10 differs from its counterpart 923 on FIG. 8 in that cone connect 1123 has a larger diameter that extends from one inner surface 912 of case end 928 to the inner wall on the opposite side of the case end. Because of this, cone connect 1123 is positioned somewhat to the right on FIG. 10 and adjacent the weld portions 921 of the case 903. The cone connect 923, by way of comparison, is positioned more to the left on FIG. 8 and has its circumference recessed within notches of the inner case end wall. Cone connect 1123 is shown in greater detail on FIG. 11 and has its outer circumference 1129 contacting inner wall 912 on FIG. 10. Immediately adjacent the outer circumference 1129 is a flat portion 1102 as shown both on FIGS. 10 and 11. The inner portion of flat surface 1102 engages a curved surface 1103 as shown on FIGS. 10 and 11 with the curved surface 1103 having a bowl like configuration. The inner extremity of bowl like surface 1103 becomes the outer extremity of a flat surface 1104 as shown on both FIGS. 10 and 11. Flat surface 1104 has a center opening 1126 through which flow tube 901 projects. The bowl like surface 1103 performs the dual function of accommodating an axially movement of flow tube 901 due to thermal expansion/contraction as well as accommodating changes in the inner diameter of case 903 due to thermal changes.

Case connect link 1110 is not identical to case connect link 910 on FIG. 8. On FIG. 8, case connect link 910 is directly connected at its ends between the inner surface 912 of case 903 and the junction of the left end 905 of balance bar 902 and the brace bar. The case connect link 1110 is different in that its has a bend in its middle and thereby comprises legs 1107 and 1108 with the leg 1108 being connected at junction 1105 to the left end of balance bar 902 and the brace bar. Alternatively, case connect link 1110 may be of a continuously curved configuration. The other portion 1107 of the case connect link is connected at its end 1106 to flat surface 1102 of cone connect 1123. The bend or curve in case connect link 1110 permits it to flex and accommodate changes in the diameter of balance bar 902 due to thermal changes. Case connect link 1110 is thus connected between the balance bar at junction 1105 and the inner wall 912 of case 903 by means of a series connection of the case connect link and a portion of the flat surface 1102 of cone connect 1123. This series connection has sufficient strength to inhibit undesired vibrational translations between the junction of the brace bar, flow tube, and balance bar with respect to the inner wall 912 of case 903.

It is to be expressly understood that the claimed invention is not to be limited to the description of the preferred embodiment but encompasses other modifications and alterations within the scope and spirit of the inventive concept. For example, although the present invention has been disclosed as comprising a part of a single straight tube Coriolis flowmeter, it is to be understood that the present invention is not so limited and may be used with other types of Coriolis flowmeters including single tube flowmeters of irregular or curved configuration as well as Coriolis flowmeters having a plurality of flow tubes. Also, raised elements 827 and 927 may either be integral with their respective flanges 806 and 906 or they may be separate elements affixed to their respective flanges. In Coriolis flowmeters made of a single material, such as stainless steel, raised elements 827 and 927 may be integral with and formed or the same stainless steel as their respective flanges. It is sometimes desired that Coriolis flowmeters use different materials for their different parts. In such flowmeters, the flow tube may be titanium and the case and flanges may be stainless steel. Also the raised inserts 827 and 927 may also be titanium to provide a flow path that is all titanium. In such flowmeters the titanium inserts 827 and 927 would be separate elements from the stainless steel flanges and would be affixed to the flanges by appropriate bonding techniques.

What is claimed is:

1. In a Coriolis flowmeter having a flow tube and a balance bar that are adapted, when in use, to be vibrated in phase opposition in a driven plane to generate a Coriolis response in said vibrating flow tube representing information pertaining to material flowing through said vibrating flow tube, said flow tube comprises a center portion and an extension at each end;

said Coriolis flowmeter comprising:

a case surrounding said flow tube center portion and said balance bar with said balance bar being substantially parallel to and surrounding said flow tube center portion;

a first and a second end of said case;

an opening in each of said case ends for receiving said flow tube extension that project beyond said case ends;

said opening in said case ends is coaxial with a longitudinal axis of said flow tube extension;

brace bar means coupling ends of said balance bar to said flow tube;

case connect link means having a first end coupled to said balance bar and having a second end coupled to an inner wall of said case;

said case connect link means is effective to inhibit the movement of said brace bar and said balance bar ends in a direction perpendicular to said longitudinal axis of said flow tube in said driven plane;

a cone connect means having an outer circumference coupled to said case end and having a circular opening coaxial with said flow tube extension for sealably receiving said flow tube extension; and said cone connect means being axially positioned between a terminus of said flow tube extension and said case connect link means.

2. The Coriolis flowmeter of claim 1 further comprising:

a cylindrical neck of said case end extending axially outward from said case end;

said neck has a center opening coaxial with said flow tube extension and a cylindrical inner surface that surrounds a portion of said flow tube extension that projects beyond said case end;

said cylindrical inner surface of said neck has a greater diameter than the diameter of said flow tube; and a circular cavity in said neck defined by the space between said flow tube extension and said cylindrical inner surface of said neck.

3. The Coriolis flowmeter of claim 1 further including an out of plane bend in a planar surface of said case connect links.

4. The Coriolis flowmeter of claim 1 wherein said circular cone connect means has a flat surface having an out of plane bend to permit a change in the effective diameter of said circular cone connect means in response to changes in the diameter of the portion of said case end to which said cone connect means is coupled.

5. The Coriolis flowmeter of claim 1 wherein said coupling of a second end of said case connect link means comprises a connection of said second end of case connect link means to said inner wall of said case.

6. The Coriolis flowmeter of claim 1 wherein said second end of said case connect link means is coupled to said wall of said case by an intermediate connection means that is connected to said inner wall of said case.

7. The Coriolis flowmeter of claim 5 wherein said intermediate connection means includes a surface of said cone connect means whose perimeter is connected to a surface of said inner wall of said case.

8. The Coriolis flowmeter of claim 1 further includes:

a driver that vibrates said flow tube center portion and said balance bar in a drive plane in phase opposition to each other;

said vibrations in said drive plane and said material flow are jointly effective for inducing Coriolis deflections in said flow tube;

pick off means coupled to said flow tube center portion that detect said Coriolis deflections;

said pick off means generate signals representing information pertaining to said material flow in response to said detection of said Coriolis deflections; and meter electronics that receive said signals from said pick off means and generates output information pertaining to said material flow.

9. The Coriolis flowmeter of claim 2 wherein said flow tube extends at a constant diameter for the length of said case and said flow tube extension project through said opening in said cone connect means at said constant diameter to said terminus of said flow tube extension.

10. The Coriolis flowmeter of claim 9 wherein said terminus of each flow tube extension is devoid of attachment to any other structure.

11. The Coriolis flowmeter of claim 9 further including:

an end flange coupled to said terminus of each said flow tube extension for enabling said Coriolis flowmeter to be coupled to a pipeline;

a raised element having a circular opening on an axial end of said end flange, and a wall on an inner surface of said circular opening that engages said flow tube extension.

12. The Coriolis flowmeter of claim 11 further including:

a sealed cavity defined by space between the outer surface of said flow tube extension and said inner cylindrical surface of said neck of said case end and a cylindrical inner surface of a portion of said end flange;

said sealed cavity having an axially outer end comprising said raised element of said end flange sealably engaged with said flow tube extension;

said sealed cavity having an axially inner end comprising said opening in said cone connect means that is in sealable engagement with said flow tube extension.

13. The Coriolis flowmeter of claim 12 further including:

a sealed cavity defined by space between the outer surface of a portion of said flow tube extension and an inner cylindrical surface of said neck of said case end and a cylindrical inner surface of a neck of said end flange;

said sealed cavity has an axially outer end comprising said raised element of said end flange that is sealably engaged with said flow tube extension;

said sealed cavity has an axially inner end comprising said opening in said cone connect means that is sealably engaged with said flow tube.

14. The Coriolis flowmeter of claim 9 further including:

an end flange;

a neck of said end flange having a first end comprising said end flange and having second end connected to an axially outer end of said neck of said case end;

a cylindrical opening in said end flange and in said neck of said end flange for receiving said terminus of said flow tube extension;

said cylindrical opening in said neck of said end flange and in a portion of said end flange has a diameter that is substantially greater than the exterior surface of said flow tube extension to define a void between said exterior surface of said flow tube extension and said cylindrical inner surface of said neck of said end flange and a cylindrical inner surface of said portion of said end flange; and a raised element in an axially outer portion of said end flange having a cylindrical opening whose walls have an inner diameter that sealably receive the terminus portion of said flow tube extension.

15. The Coriolis flowmeter of claim 2 wherein:

said case includes walls parallel to the longitudinal axis of said flow tube;

said case further includes said case ends which are affixed to ends of said walls and are oriented substantially perpendicular to said cylindrical walls;

the exterior surfaces of said case ends include a circular lip coaxial with said opening in said case ends for defining said cone connect means and for receiving said portion of said flow tube extension that projects beyond said case ends;

said case ends further including a neck having a cylindrical inner surface of a greater diameter than the exterior surface of said flow tube extension to define a void comprising the space between said exterior surface of said flow tube extension and said inner surface of said neck.

16. The Coriolis flowmeter of claim 15 further including:
an end flange coupled to said terminus of said flow tube extension for enabling said Coriolis flowmeter to be coupled to a pipeline.

17. The Coriolis flowmeter of claim 9 wherein said case comprises:
cylindrical walls oriented parallel to the longitudinal axis of said flow tube;
said case ends are curved and offset from perpendicular with respect to said cylindrical walls;
an inner surface of a curved portion of said case end includes means that receives the outer extremity of said circular cone connect means;
said flow tube extends the length of said case and said flow tube extension extend through a center opening of said cone connect means and through said cavity of said neck of said case end to a flow tube extension terminus axially beyond said neck.

18. The Coriolis flowmeter of claim 17 wherein said terminus of said flow tube extension is devoid of attachment to any other structure.

19. The Coriolis flowmeter of claim 17 further including:
an end flange coupled to said terminus of said flow tube extension for enabling said Coriolis flowmeter to be coupled to a pipeline.

20. The Coriolis flowmeter of claim 9 wherein said case comprises:
cylindrical walls oriented parallel to the longitudinal axis of said flow tube center portion;
said case ends have a curved portion that is offset from perpendicular with respect to said cylindrical walls;
an inner surface of an axial inner portion of said case end has a diameter equal to the inner diameter of said case for receiving the outer extremity of said circular cone connect means;
said flow tube center portion extends the length of said case and has said flow tube extension that extend through a center opening of said cone connect means and through said cavity of said neck of said case end to a terminus axially beyond said neck.

21. The Coriolis flowmeter of claim 20 wherein said terminus of each flow tube extension of said flow tube is devoid of attachment to any other structure.

22. The Coriolis flowmeter of claim 20 further including:
an end flange coupled to said terminus of said flow tube extension for enabling said Coriolis flowmeter to be coupled to a pipeline.

23. The Coriolis flowmeter of claim 20 wherein said Coriolis flowmeter further includes:
an end flange;
a cylindrical opening in said end flange for receiving said terminus of said flow tube extension;
a neck of said end flange having a first end integral with an axially outer portion of said end flange and having an axially inner end connected to an axially outer end of said neck of said case end;
said end flange and said neck of said end flange both have a cylindrical inner surface coaxial with said flow tube extension;
said cylindrical inner surface opening in said neck of said end flange as well as in an axially inner portion of said end flange has a diameter that is substantially greater than the exterior surface of said flow tube extension to define a void between said exterior surface of said flow tube extension and said cylindrical inner surface of said neck of said end flange and said axially inner portion of said end flange; and
an axially outer portion of said end flange defines a raised element having a center opening whose inner walls have a diameter approximate that of said flow tube extension diameter for sealably receiving the terminus of said flow tube extension.

24. The Coriolis flowmeter of claim 20 wherein said case connect link comprises:
a flat elongated member having a bend in a mid portion of said member to define two legs of said member that are angularly oriented with respect to each other;
an outer end of a first one of said legs being connected to an end of said balance bar;
an outer end of a second one of said legs being connected to a surface of said cone connect means to define a series path connecting said end of said balance bar with said inner wall of said case;
said series path comprises said first and second legs of said case connect link and a portion of said cone connect means.

25. The Coriolis flowmeter of claim 24 wherein said two legs are oriented substantially 90 degree with respect to each other.

26. The Coriolis flowmeter of claim 24 wherein said terminus of said flow tube extension is devoid of attachment to any other structure.

27. The Coriolis flowmeter of claim 24 further including:
an end flange coupled to said terminus of said flow tube extension for enabling said Coriolis flowmeter to be coupled to a pipeline.

28. The Coriolis flowmeter of claim 20 wherein said case connect link comprises:
a flat elongated curvilinear member;
an outer end of a first one of said legs being connected to an end of said balance bar;
an outer end of a second one of said legs being connected to a surface of said cone connect means to define a series path connecting said end of said balance bar with said inner wall of said case;
said series path comprises said case connect link and a portion of said cone connect means.

29. The Coriolis flowmeter of claim 20 wherein said case connect link comprises:
an elongated member having at least one bend;
an inner end of said elongated member is connected to an end of said balance bar;
an outer end of said elongated member is connected to a surface of said cone connect means to define a series path connecting said end of said balance bar with said inner wall of said case;
said series path comprises said case connect link and a portion of said cone connect means.

30. The Coriolis flowmeter of claim 1, formed by the steps of:
enclosing said flow tube and said balance bar in said case;
sealably coupling said opening in said cone connect to said flow tube extension;
coupling ends of said balance bar to said flow tube with brace bar means;

coupling said brace bar and said balance bar to an inner wall of said case with case connect link means;

forming a cylindrical neck on said case end having a center coaxial with said flow tube extension extending axially outward from said case end;

said neck surrounds said flow tube extension that project beyond said case end and has an inner cylindrical surface of a greater diameter than a diameter of said flow tube extension;

forming a circular cavity in said neck is defined by the space between the outer surface of said end portion of said flow tube extension and said cylindrical inner surface of said neck;

extending said flow tube and said flow tube extension at a constant diameter for the length of said case so that said flow tube extension project through said opening in each case end at said constant diameter to a terminus beyond each said case end;

said terminus of each end portion of said flow tube extension is devoid of attachment to any other structure.

* * * * *

UNITED STATES PATENT AND TRADEMARK OFFICE
CERTIFICATE OF CORRECTION

PATENT NO.    : 6,343,517 B1
DATED         : February 5, 2002
INVENTOR(S)   : Craig Brainerd Van Cleve, Gregory Treat Lanham, Curtis John Ollila and Ernest Dale Lister It is certified that error appears in the above-identified patent and that said Letters Patent is hereby corrected as shown below:

Column 10,
Line 56, replace "designed and calibrated. The vibration amplitude of the" with -- designed. The vibration amplitude of the --

Column 17,
Line 66, replace "terminus of each flow tube extension is devoid of attachment" with -- terminus of each said flow tube extension is devoid of attachment --

Signed and Sealed this

Twentieth Day of August, 2002

*Attest:*

*Attesting Officer*

JAMES E. ROGAN
*Director of the United States Patent and Trademark Office*